United States Patent
Dykstra

(10) Patent No.: US 9,375,986 B1
(45) Date of Patent: Jun. 28, 2016

(54) CART AND HITCH INSERT APPARATUS FOR A VEHICLE

(71) Applicant: Greg R. Dykstra, St. Simons Island, GA (US)

(72) Inventor: Greg R. Dykstra, St. Simons Island, GA (US)

(\*) Notice: Subject to any disclaimer, the term of this patent is extended or adjusted under 35 U.S.C. 154(b) by 0 days.

(21) Appl. No.: 14/694,626

(22) Filed: Apr. 23, 2015

(51) Int. Cl.
*B60R 9/06* (2006.01)
*B60D 1/48* (2006.01)
*B62B 1/00* (2006.01)

(52) U.S. Cl.
CPC ... *B60D 1/48* (2013.01); *B60R 9/06* (2013.01); *B62B 1/00* (2013.01)

(58) Field of Classification Search
CPC .......... B65F 1/1473; B60R 9/06; B60R 11/00
USPC .............. 280/769, 401, 402, 415.1, 474, 495, 280/508, 509, 510; 224/519, 521, 495, 506; 414/462
See application file for complete search history.

(56) References Cited

U.S. PATENT DOCUMENTS

| 7,143,914 | B2 * | 12/2006 | McManus | 224/519 |
| 7,217,078 | B2 * | 5/2007 | Short | 414/462 |
| 8,505,951 | B2 * | 8/2013 | Bohse | 280/491.1 |
| 2006/0145461 | A1 * | 7/2006 | Anderson | 280/769 |
| 2007/0170218 | A1 * | 7/2007 | Robb | 224/519 |
| 2007/0221695 | A1 * | 9/2007 | Winkler | 224/519 |
| 2010/0176170 | A1 * | 7/2010 | O'Hare | 224/519 |

\* cited by examiner

*Primary Examiner* — Anne Marie Boehler
(74) *Attorney, Agent, or Firm* — Jonathan Rigdon Smith, J.D., PC; Jonathan R. Smith

(57) ABSTRACT

A special hitch insert, adapted to receive a rolling cart, can be inserted into a standard vehicle hitch. The hitch insert allows the cart to be loaded at ground level, rolled to the rear of the vehicle, and secured to the hitch insert by using the cart as a lever to raise the cart and lock it onto the hitch insert at the level of the receiving hitch.

5 Claims, 7 Drawing Sheets

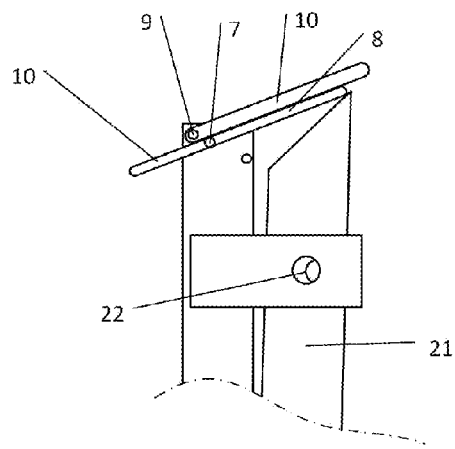
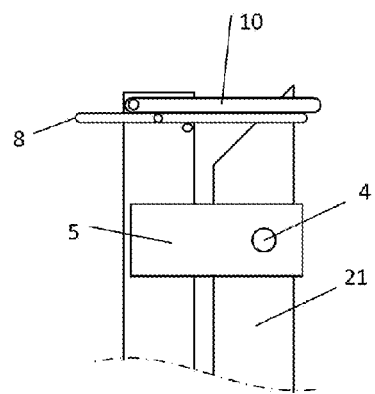
FIG. 5    FIG. 6
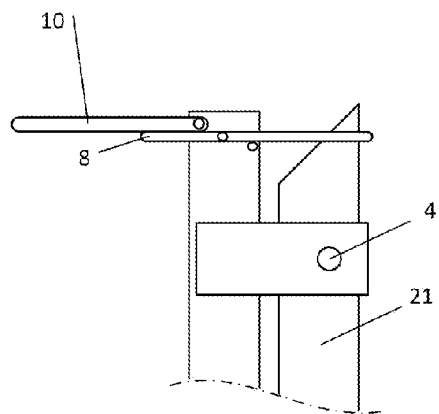
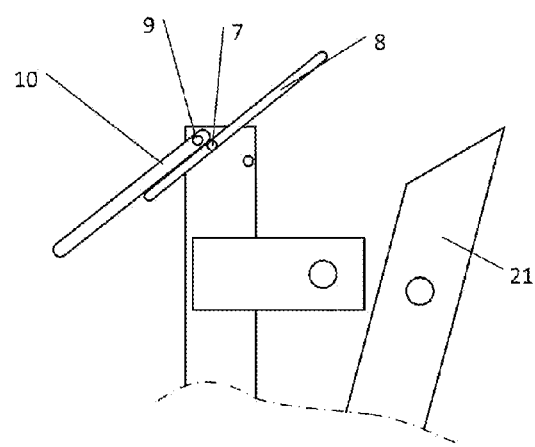
FIG. 7    FIG. 8

CART AND HITCH INSERT APPARATUS FOR A VEHICLE

CROSS-REFERENCES TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A BIOLOGICAL SEQUENCE LISTING

Not applicable.

BACKGROUND OF INVENTION

1. Field of the Invention

This invention is in the field of land vehicles, more specifically in the field of cargo carrying attachments for such vehicles, and still more specifically in the field of detachable cargo carriers which function as land vehicles themselves. It is also in the fields of article carriers, and supports.

2. Description of the Related Art

Detachable cargo carriers of many kinds, and such carriers which are themselves vehicles, have been used for many years. An example of the former is a box, trunk or cooler fixed to the rear of a vehicle. Examples of the latter are a vehicle towed by another vehicle, and a wheelchair carried in a van.

More recently, with the advent of receiving hitches being installed below the rear bumpers of vehicles (typically pickup trucks) rectangular horizontal carriers and trays have been created with a hitch insert on the front side. When the hitch insert is inserted into the receiving hitch, a tray approximately bumper high is available upon which to load articles for transport. A variant of this device incorporates a folding ramp on another side of the tray, permitting a motorcycle, wheelchair, etc. to be rolled from ground level up onto the tray.

A drawback of these devices are that they are often heavy and cumbersome to install into the receiving hitch and so, once installed, they tend to be left in place as an extension of the rear of the vehicle even when not carrying anything. This poses problems with parking and other vehicle maneuvering. Another drawback is that, in the absence of a ramp, or when articles to be carried cannot be rolled up a ramp, they have to be lifted from the ground to the tray.

BRIEF DESCRIPTION OF THE INVENTION

Objects of the Invention

There is thus a need for a carrier that can be installed and removed easily by one person, and that can be loaded near ground level before being installed into a receiving hitch.

SUMMARY OF THE INVENTION

The present invention is a combination of a carrying cart and hitch insert for a vehicle having a receiving hitch. The hitch insert is relatively small and lightweight and may either be installed and removed as needed from the receiving hitch or left in place without presenting a significant maneuvering problem for the vehicle. The carrying cart resembles a hand truck but it is adapted to be secured simply and securely to the hitch insert. The cart can be loaded at ground level, rolled to the rear of the vehicle, and secured to the hitch insert by using the cart as a lever to raise it and lock it at the level of the receiving hitch.

BRIEF DESCRIPTION OF THE DRAWINGS

FIG. 5 is a left side view of the cart portion of the invention being raised toward a locking position on the first embodiment of the hitch insert portion of the invention.

FIG. 6 is a left side view of the cart portion of the invention locked on the first embodiment of the hitch insert portion of the invention.

FIG. 7 is a left side view of the first step of releasing the cart portion of the invention from the first embodiment of the hitch insert portion of the invention.

FIG. 8 is a left side view of the second step of releasing the cart portion of the invention from the first embodiment of the hitch insert portion of the invention.

DETAILED DESCRIPTION OF THE INVENTION

Figure 1:
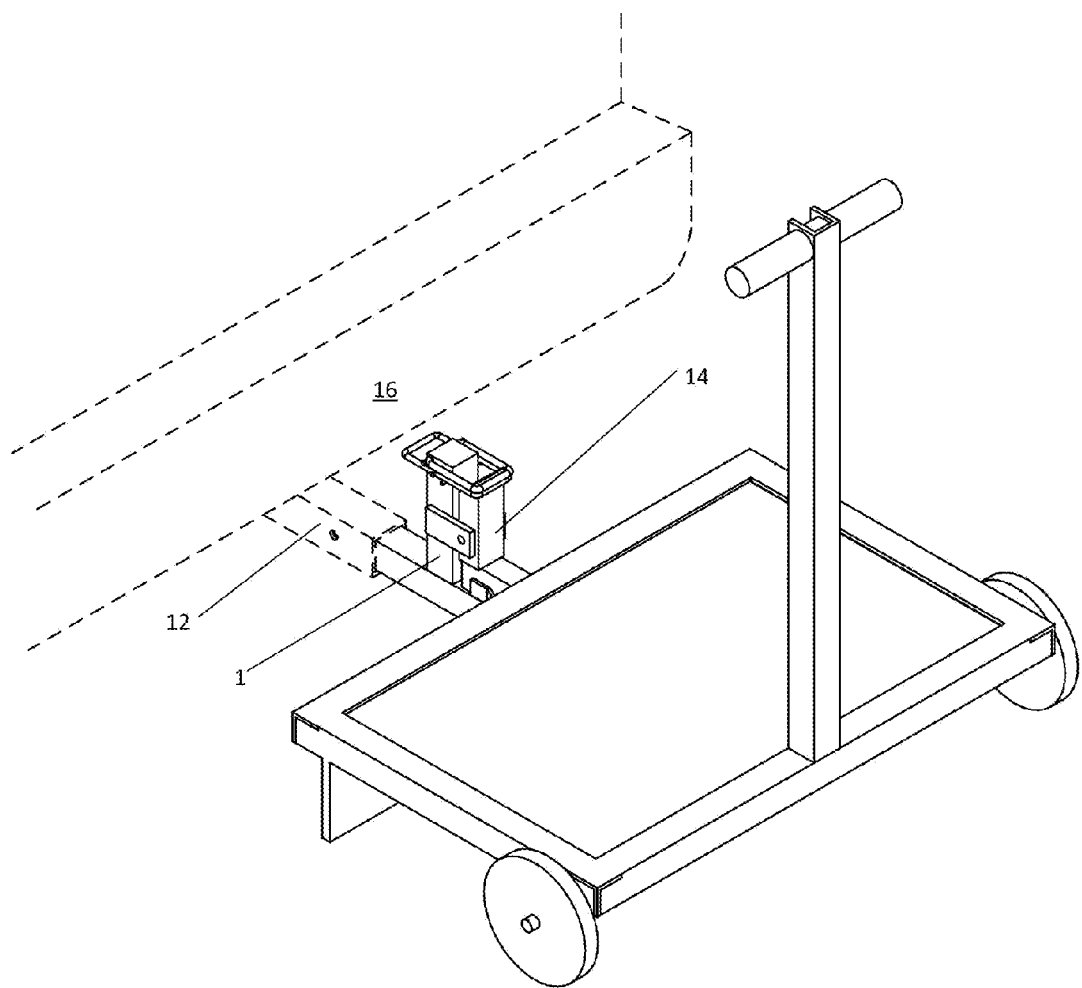
FIG. 1 is a left rear oblique view of the first embodiment of the invention installed on a vehicle.

Referring now to the drawings, in which like reference characters refer to like elements among the drawings, FIG. 1 shows a left rear oblique view of the first embodiment of the invention installed on a vehicle. The rear of a vehicle 16 is shown having a receiving hitch 12 affixed below the rear bumper. The vehicle 16 and the receiving hitch 12 are shown in dashed lines as environmental structure. Receiving hitches are commonplace on towing vehicles, utilized for attaching a towing implement to the vehicle such as a hitch ball for towing a trailer (not shown). The present invention consists of a hitch insert 1 and a cart 14.

Figure 2:
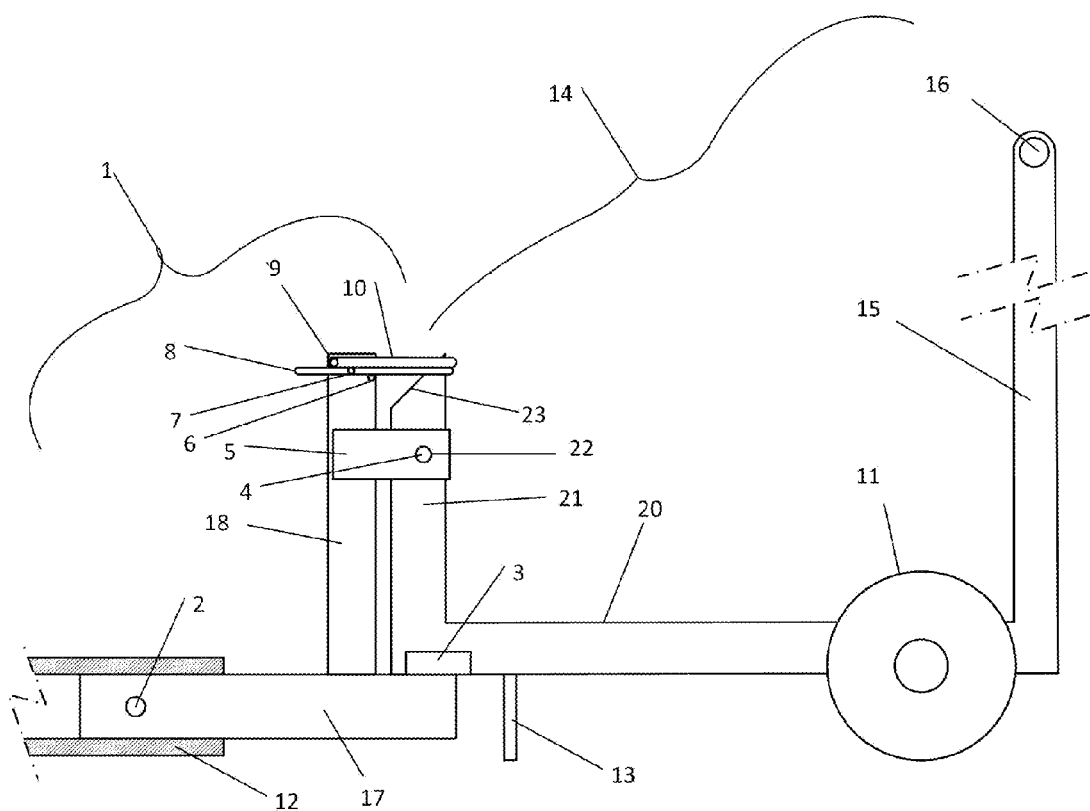
FIG. 2 is a left side view of the first embodiment installed on a vehicle.

FIG. 2 is a left side view of the first embodiment installed on a vehicle. The hitch insert portion 1 comprises a horizontal bar 17 sized to fit the receiving hitch 12, both of which have aligned tow pin holes 2 for receiving a tow pin (not shown). A vertical post 18 is welded to the bar 17. Part way up post 18 are right and left collars 5 welded to the post. A straight primary latch pin 4 is inserted through holes bored through both collars to receive the pin. Near the top of post 18 is a U-shaped counterweight 10 that pivots about first pivot 9. Just below counterweight 10 is a rounded rectangular secondary latch 8 pivotable about second pivot 7. Both counterweight 10 and secondary latch 8 are prevented from rotating clockwise beyond the horizontal by retaining pin 6. At the rearmost end (rightmost in this view) of the bar 17 is a pair of shaped retainers 3 welded to the top surface of bar 17, which serve to guide cart 14 into place for securing it to hitch insert portion 1. The hitch insert portion 1 and the foregoing components distinguish the two embodiments herein described from each other.

The drawings show some portions as solid, some as angle iron or other shapes. It should be understood that solid pieces may be hollow, angle iron may be solid bars or channels, etc. all within the scope of the present invention.

FIG. 2 also shows the cart portion 14 of the invention. It comprises an article supporting part 20, here shown as a solid flat platform, rear wheels 11, a forward stand 13, an upright handle 15, and a grip 16. The scope of the present invention includes any configuration of platform that can support articles placed on it. It need not be rectangular, and it may include vertical walls or special article-holding features such as pegs, straps, a weather enclosure, etc. without limitation as long as they do not interfere with the function of the means of attachment of the cart portion to the hitch insert portion as described below. The scope of the present invention also includes handle configurations other than that shown, a wheel or wheels in place of forward stand 13, skids instead of wheels, etc. as long as such options allow the below-described functionality of the means of attachment of the cart portion to the hitch insert portion.

At the forward end of cart portion 14 is a shaped pillar 21 which engages cart portion 14 to hitch insert portion 1. Pillar 21 has a hole 22 bored through it to accept primary latch pin 4. At the upper end of pillar 21 is a forward-facing bevel 23.

Figure 3:
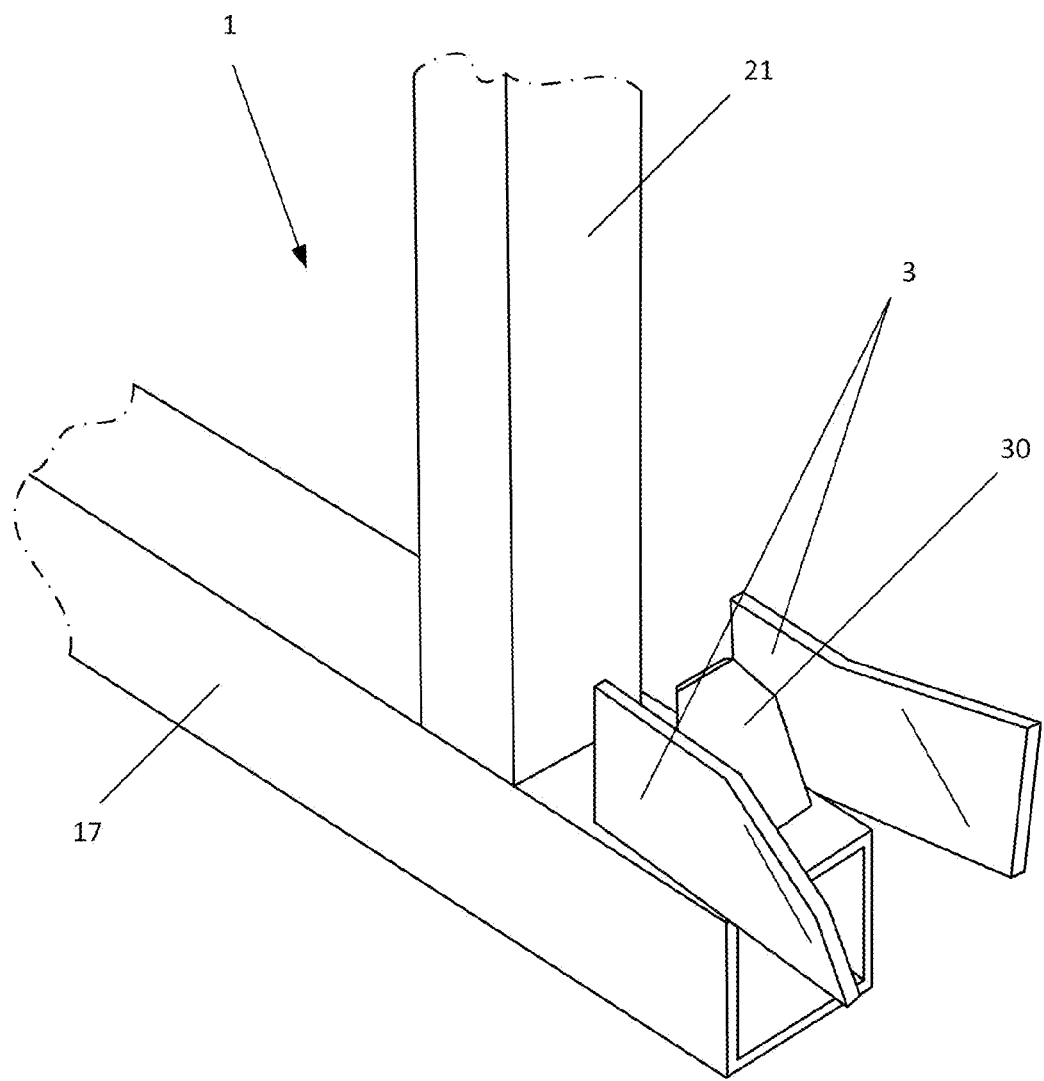
FIG. 3 is a left rear oblique view of the lower end of the hitch insert portion of the invention.

FIG. 3 is a left rear oblique view of the lower end of the hitch insert portion 1 of the invention. This view shows shaped retainers 3 welded to vertical post 18 and horizontal bar 17. Between retainers 3 is a forward-facing catch 30 which serves to help position pillar 21 correctly relative to hitch insert portion 1 and provide additional security against rearward motion of cart portion 14 (not shown).

Figure 4:
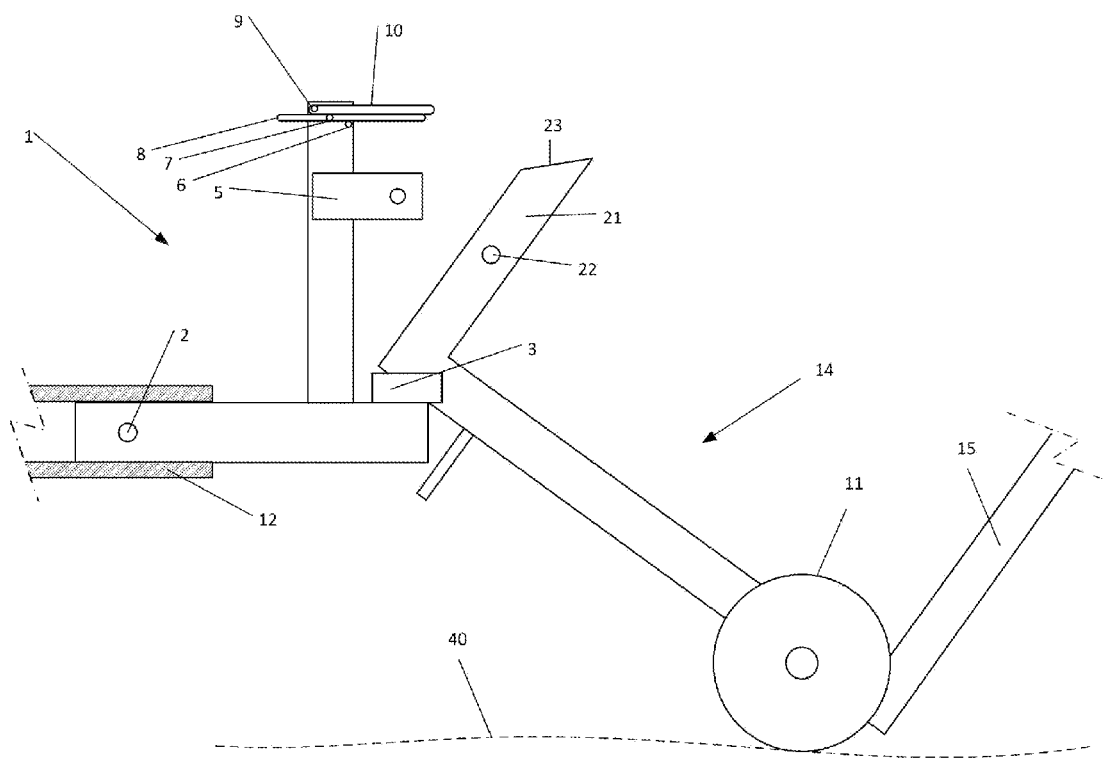
FIG. 4 is a side view of the cart portion of the invention being installed on the hitch insert portion of the first embodiment of the invention.

FIG. 4 is a side view of the cart portion 14 of the invention being installed on the hitch insert portion 1 of the first embodiment of the invention. After hitch insert portion 1 is installed in and pinned to hitch 12, the user rotates U-shaped counterweight 10 clockwise about first pivot 9 so that it rests upon the rearward portion of secondary latch 8 as shown. With proper weighting of counterweight 10 and secondary latch 8, their combined center of gravity will then be rearward of second pivot 7. Next, cart portion 14 is tilted back using handle 15 and rolled into position behind the vehicle on wheels 11 along the ground 40 behind the vehicle. The lower end of pillar 21 is positioned between shaped retainers 3 and moved back and forth slightly until catch 30 (not visible in this view) enters a corresponding notch (not visible) underneath pillar 21. Handle 15 is then raised, rotating cart portion 14 and pillar 21 counterclockwise.

FIG. 5 shows pillar 21 approaching the vertical, locking orientation. When the upper surface of pillar 21 contacts secondary latch 8, its beveled surface raises both secondary latch 8 and counterweight 10.

FIG. 6 shows that when pillar 21 reaches a nearly vertical orientation, secondary latch 8 clears the top of pillar 21 and falls into position behind pillar 21 because the combined center of gravity of secondary latch 8 and counterweight 10 are to the right of second pivot 7. Secondary latch 8 then holds pillar 21 upright so that latch pin 4 can be inserted through hole 22. Wheels 11 will then be well clear of the ground. It must be noted that the precise shapes of the counterweight 10 and secondary latch 8 need not be U-shaped and a rounded rectangle, respectively, so long they are shaped to be raised by the bevel 23 when it moves toward post 18 and fall behind pillar 21 and prevent it from moving away from post 18.

FIG. 7 shows the first step in releasing the cart portion 14 from the hitch insert portion 1, namely, that the user flips counterweight 10 to the left (counterclockwise about first pivot 9). This places the combined center of gravity of secondary latch 8 and counterweight 10 to the left of second pivot 7. The user then pulls the latch pin 4 so that only secondary latch 8 is holding the cart portion up.

FIG. 8 shows that when the user lifts the handle 15 on the cart portion (not shown in this view) a small amount, counterweight 10 causes secondary latch 8 to rotate counterclockwise, out of the way of pillar 21. The user can then lower the wheels at the rear of the cart portion to the ground.

Figure 9:
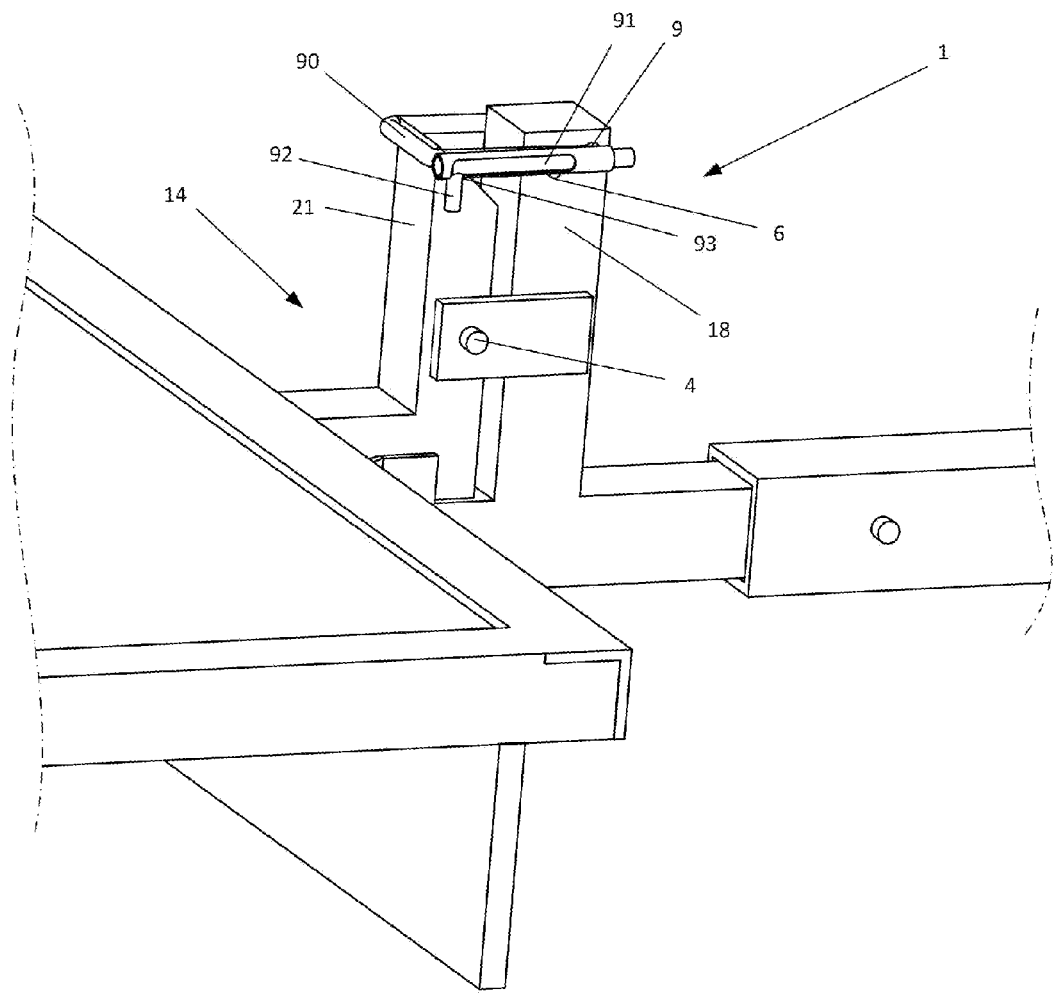
FIG. 9 is a right rear oblique view of the hitch insert portion of the second embodiment of the invention locking the cart portion of the invention in place.

FIG. 9 is a right rear oblique view of the hitch insert portion of the second embodiment of the invention locking the cart portion 14 of the invention in place. This second embodiment differs from the first in that there is no secondary latch, and instead of a counterweight, a primary latch 90 is provided that contains a movable counterweight in the form of a sliding bolt 91. The sliding bolt 91 can be moved by bolt handle 92, and by proper weighting of the components, when bolt 91 is fully to the left as shown, the combined center of gravity of latch 90 and bolt 91 is to the left of pivot 9. Primary latch 90 is restrained from rotating past the horizontal in the counterclockwise direction by retaining pin 6.

As in the first embodiment, when cart portion 14 is installed onto hitch insert 14, the beveled top of pillar 21 raises latch 90 when cart portion 14 is lifted sufficiently, and allows it to fall back into the horizontal position, holding pillar 21 in place so that latch pin 4 can be inserted. Note the safety feature provided by bolt handle 92 and bolt handle notch 93. Bolt 91 cannot move to the right without human intervention, because gravity keeps bolt handle 92 oriented vertically in bolt handle notch 93.

To release the cart portion 14, bolt handle 92 is rotated upward and bolt 91 is pushed forward (to the right in this view) shifting the center of gravity of latch 90 to the right of pivot 9. However, the weight of the cart portion 14 pulls pillar 21 against latch 90, keeping pillar 21 vertical so that latch pin 4 can then be removed.

Figure 10:
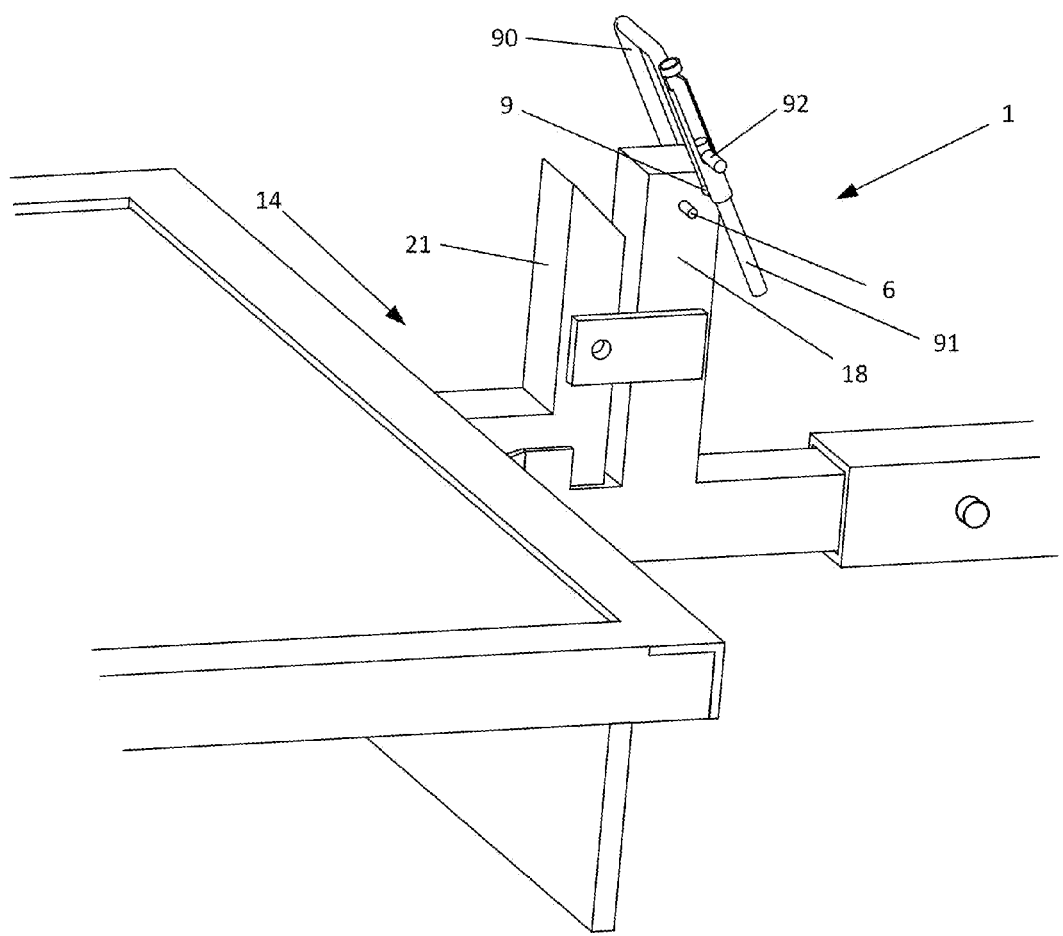
FIG. 10 is a right rear oblique view of the hitch insert portion of the second embodiment of the invention releasing the cart portion of the invention.

FIG. 10 illustrates what happens when the user lifts the cart handle, taking the weight off pillar 21. The latch 10 pivots clockwise, releasing pillar 21, and allowing the rear of cart portion 14 to be lowered to the ground.

The invention claimed is:

1. An apparatus, comprising:
 a cart portion comprising:
  an article-supporting part having a front end and a rear end;
  at least one elongate handle proximate to and extending upwardly from the rear end;
  means proximate to the rear end allowing the cart portion to be moved along the ground;
  a substantially vertical pillar extending upwardly from the front end;
 a hitch insert portion shaped to fit a receiving hitch, the hitch insert comprising:
  a substantially horizontal elongate bar extending rearwardly from the receiving hitch;
   the bar having an upper surface, a forward end, and a rearward end;
  a substantially vertical post fixed to the upper surface of the bar;
   the vertical post comprising at least one latch rotatably secured to the post;

the at least one latch comprising:
- a first pivot proximate to the top of the post that is substantially perpendicular to the elongate bar;
- a rear structure shaped to fit behind the pillar; and
- means for shifting the weight distribution of the latch from one that lowers the rear structure behind the pillar to one that raises it.

2. The apparatus of claim 1, wherein:

said means for shifting the weight distribution of the latch comprises:
- a front structure on said at least one latch; and
- a counterweight having a second pivot above and parallel to said first pivot so that in a locking position the counterweight rests on top of said rear structure, and to be released the counterweight must be rotated about the second pivot to rest on top of said front structure.

3. The apparatus of claim 1, wherein:

said means for shifting the weight distribution of the latch comprises:
- a bolt slidably attached to said latch so that in a locking position the bolt shifts the center of gravity of the combined bolt and latch rearwardly of said first pivot, and in a releasing position the bolt shifts the center of gravity of the combined bolt and latch forwardly of said first pivot.

4. The apparatus of claim 3, in which:

said bolt is most stable horizontally when said bolt is in its farthest rearward position.

5. The apparatus of claim 4, wherein:

said bolt is held in its farthest rearward position by a bolt handle that rotates to its lowest position by engaging a vertical bolt handle notch.

\* \* \* \* \*